US007435057B2

(12) United States Patent
    Parera

(10) Patent No.: US 7,435,057 B2
(45) Date of Patent: Oct. 14, 2008

(54) BLADE FOR WIND TURBINE

(76) Inventor: Jorge Parera, 86 Pequot La., New Canaan, CT (US) 06840

(*) Notice: Subject to any disclaimer, the term of this patent is extended or adjusted under 35 U.S.C. 154(b) by 425 days.

(21) Appl. No.: 11/179,982

(22) Filed: Jul. 13, 2005

(65) Prior Publication Data
    US 2007/0014657 A1    Jan. 18, 2007

(51) Int. Cl.
    *B63H 1/28*    (2006.01)
(52) U.S. Cl. .................. 416/231 R; 416/232; 415/81
(58) Field of Classification Search .................. 416/232, 416/231 R, 231 B, 175, 203, 146 R, 120; 415/62, 63, 80, 81
    See application file for complete search history.

(56) References Cited

U.S. PATENT DOCUMENTS

| 4,596,512 | A | * | 6/1986 | Krauss et al. .................. 416/42 |
| 5,226,805 | A | * | 7/1993 | Proven .................... 416/132 A |
| 2004/0031321 | A1 | * | 2/2004 | Orsat ........................ 73/170.01 |
| 2004/0201220 | A1 | * | 10/2004 | Andersen et al. .............. 290/44 |

* cited by examiner

*Primary Examiner*—Edward Look
*Assistant Examiner*—Asefeh Hemmati
(74) *Attorney, Agent, or Firm*—Marvin N. Gordon

(57) ABSTRACT

A blade for a wind turbine includes a device for causing air at an increased velocity and/or pressure to escape from exit openings in the blade, thereby to apply a force. Pressure and diameter adjustable valves may be provided at each exit opening or orifice to allow the air to exit from the blade only when the air pressure within the blade exceeds a preset level. Also disclosed is the provision of valves at the exit openings or orifices on an opposite edge of the blade that allows air to escape from the blade to slow down but not stop rotation of the blade when a dangerous wind condition is detected.

11 Claims, 5 Drawing Sheets

Entry of air by the rear or lateral side of the blade

Wind direction

Entry of air by the rear or lateral side of the blade

Wind direction

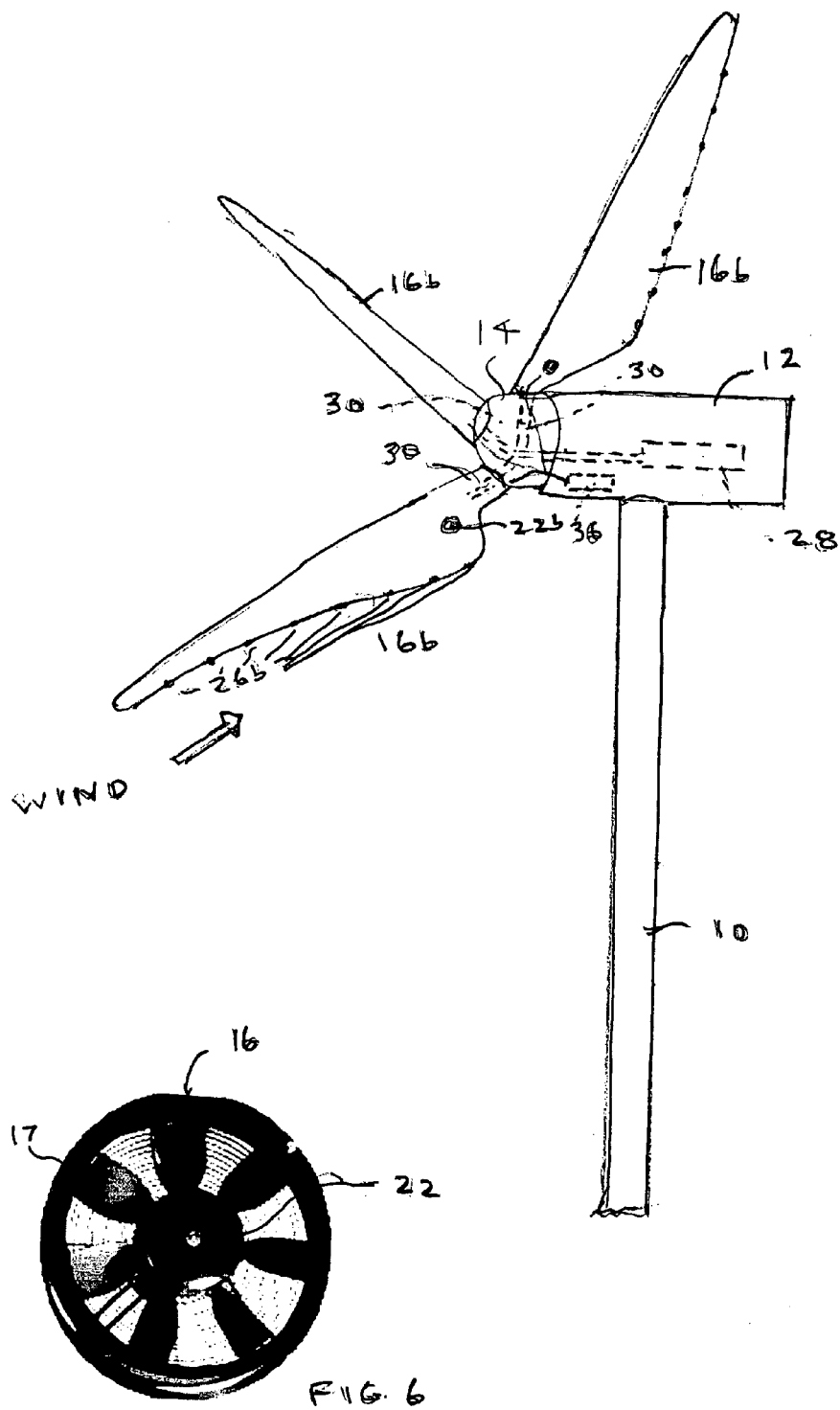

BLADE FOR WIND TURBINE

BACKGROUND OF THE INVENTION

1. Field of the Invention

The present invention relates generally to wind turbine technology, and more particularly to a blade for use in a wind turbine having increased efficiency and utility.

2. Description of the Prior Art

Particularly within the past decade or so, it is becoming increasingly clear that alternatives to fossil fuels to generate electricity are needed and that this need is becoming more critical with each passing year. The pollution caused by the burning of fossil fuels to generate electricity has already created significant destruction to the environment resulting in global warming, which if not stopped or reduced significantly, could well lead to disastrous declines in the quality of life of billions of people around the world. The supply of fossil fuels is constantly being depleted, and as the demand for electricity continues to surge dramatically in countries such as China, the cost of fossil fuels will continue to rise and the supply of fossil fuels will become more scarce.

In addition to nuclear and solar energy, the use of wind energy to generate electricity has long been considered and has already found widespread use. The supply of wind is unlimited, free in cost, widely available and free of pollutants. The conventional wind turbine electrical generator includes a group, typically three, of aerodynamically shaped blades mounted for rotation atop a tower. The blades are mounted at one of their ends to a hub, which, in turn, drives the rotor of an electrical generator. As the prevailing wind passes over the blades they are caused to rotate, which, in turn, causes the rotor to turn in the generator, thereby to generate electricity in a known manner. The electricity thus generated is collected for transmission to a local facility for further transmission along power lines to the consumers of the electricity.

Although it has clear advantages over fossil fuel, such as its unlimited supply and freedom from pollutants, the use of wind power has thus far been limited as a result of the relatively high cost of generation of electricity and the relatively low yield for the monies invested in building wind turbines. One problem in the use of wind turbine technology to generate electricity occurs when the velocity of the ambient wind is too low to drive the turbine blades to generate a sufficient amount of energy. A second problem arises when the wind velocity is too great, which could result in the damage or even destruction of the wind turbine. When the latter condition occurs, the wind turbine is typically shut down until the wind velocity returns to normal levels. It is thus not unusual for a wind turbine to achieve only about 30% of its energy-generation capacity. Moreover, even at normal wind velocities, the efficiency of conventional wind turbines to produce significant amounts of electricity at competitively low costs is limited by the current technologies.

As a result of the inherent advantages of wind turbine technology numerous attempts have been made over the past decades to improve the various elements of the wind turbine, particularly to improve the blade design, including the use of blades having hollow interiors. Although the efficiency of generation of electricity by wind turbines has steadily increased, it has not yet reached levels at which wind turbine technology can compete widely with fossil fuels.

There thus remains a need for an improved wind turbine that can operate more efficiently at all levels of wind velocity, thereby to greatly increase the use of wind turbine technology as an economically viable alternative to fossil fuels in the generation of electricity.

It is thus an object of the present invention to provide a blade for a wind turbine that allows the turbine to operate at a higher efficiency and at a reduced unit cost.

It is another object of the invention to provide a wind turbine blade that allows the wind turbine to be used more effectively over a wide range of wind velocities, thereby increasing the yield and utility of the turbine over greater periods of usage.

It is also an object of the invention to provide a wind turbine blade that allows the turbine to be used to generate electricity in the event of dangerously high wind conditions as well as at low wind velocities.

It is a further object of the invention to provide a wind turbine design in which the blade interior space is converted into a pressurized air chamber giving exit of air from the blade interior through valves located along one edge of the blade so that streams of air are expelled from the blade at high speed.

SUMMARY OF THE INVENTION

The present invention is directed to an improved design of the blade used in a wind turbine electrical generator. In this design the speed and/or the pressure of the air in the hollow interior of the blade is increased such that when the air is released through openings in the blade wall from the blade interior, it creates an increased thrust to the blade causing it to rotate at a greater speed, thereby producing more electrical energy in a more efficient manner. In one embodiment of the invention, the velocity of the air within the blade interior is increased by the provision of a fan or vacuum at an air inlet. The air at an increased velocity escapes from the blade interior through an exit port or orifice or through a longitudinal exit port. In another embodiment of the invention, the air within the blade interior is compressed to an increased pressure. When the compressed air reaches a preset level, valves located at the outlet or exit ports of the blade open to allow the air at the increased pressure to escape from the blade interior. In a further embodiment of the invention, a sensor in response to an excessively high wind velocity opens another set of valves to release air from the interior of the blade in the opposite direction to slow down the blade to a safe velocity.

To the accomplishment of the above and such further objects as may hereinafter appear, the present invention relates to a wind turbine blade substantially as defined in the appended claims as considered in conjunction with the following detailed description of preferred embodiments thereof along with the accompanying drawings in which:

BRIEF DESCRIPTION OF THE DRAWINGS

FIG. 5 is a perspective similar to FIG. 1 showing features of the present invention; and FIG. 6 is an end view of a fan or vacuum that can be employed in the wind turbine blade of the invention.

DETAILED DESCRIPTION OF THE PREFERRED EMBODIMENTS

Figure 1:
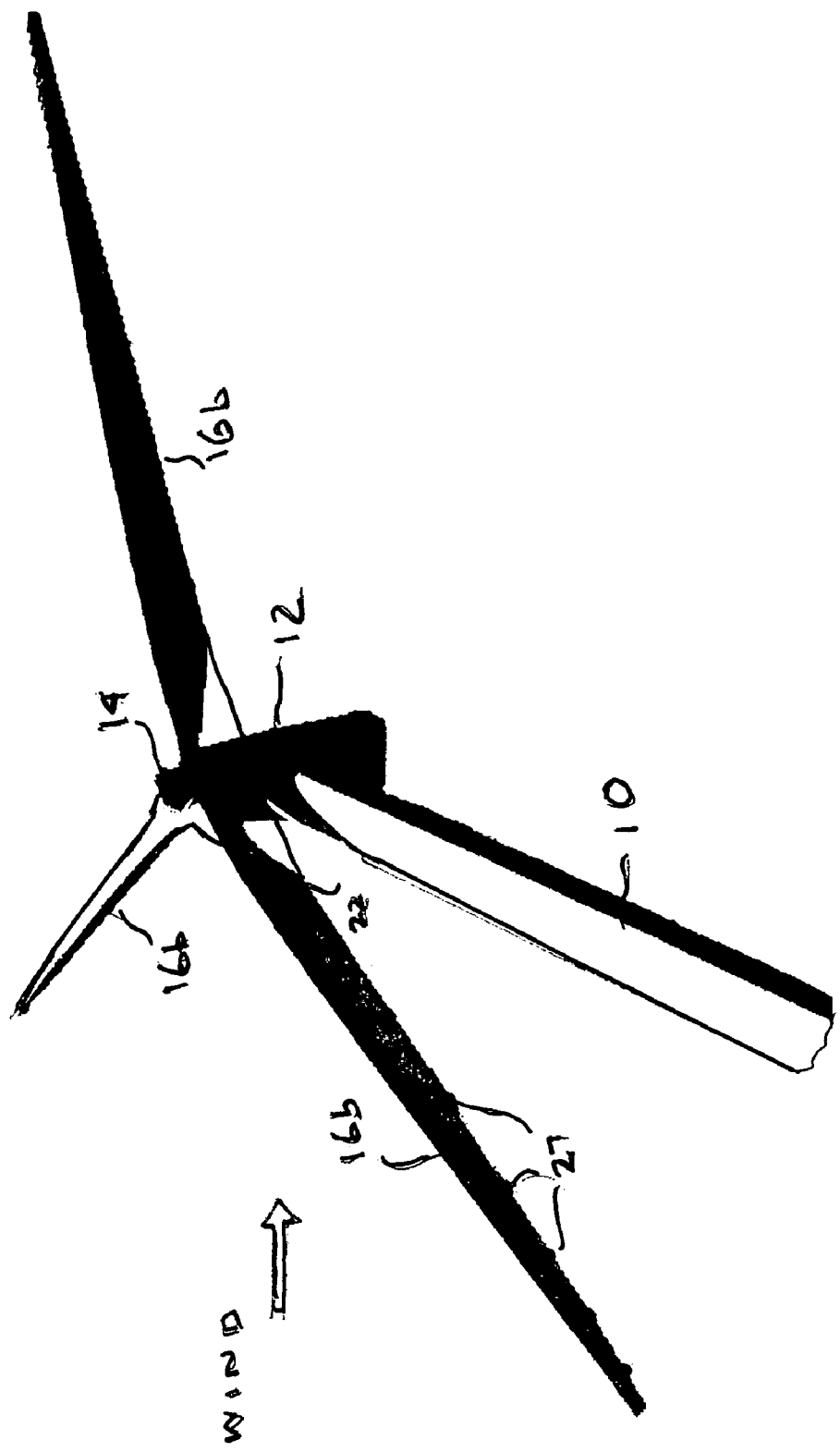
FIG. 1 is a perspective of a wind turbine employing turbine blades in accordance with the present invention.

Referring to the drawings, there is shown in FIG. 1 a wind turbine supported on a tower 10. Mounted on top of the tower is a nacelle 12, which houses, as is conventional, a generator (not shown) whose rotor (also not shown) is bearing mounted to the nacelle. A blade hub 14 is secured to the free end of the rotor and three equiangularly spaced turbine blades 16 are secured at their lower ends to the blade hub 14. The blades 16 in FIG. 1 are, for purposes of illustration, of the configuration described below with respect to the embodiment of the invention illustrated in FIG. 3. As is conventional, the blades 16 are in the shape of an airfoil so that as the ambient wind passes over the blade surface, the blades are caused to rotate and to cause the rotor to rotate in the generator so as to generate electricity, also in a conventional manner. In accordance with the present invention, the turbine blades 16 are designed to produce a greater amount of electricity for a given ambient wind velocity and to operate effectively over a greater range of wind velocities than has heretofore been achievable.

Figure 2:
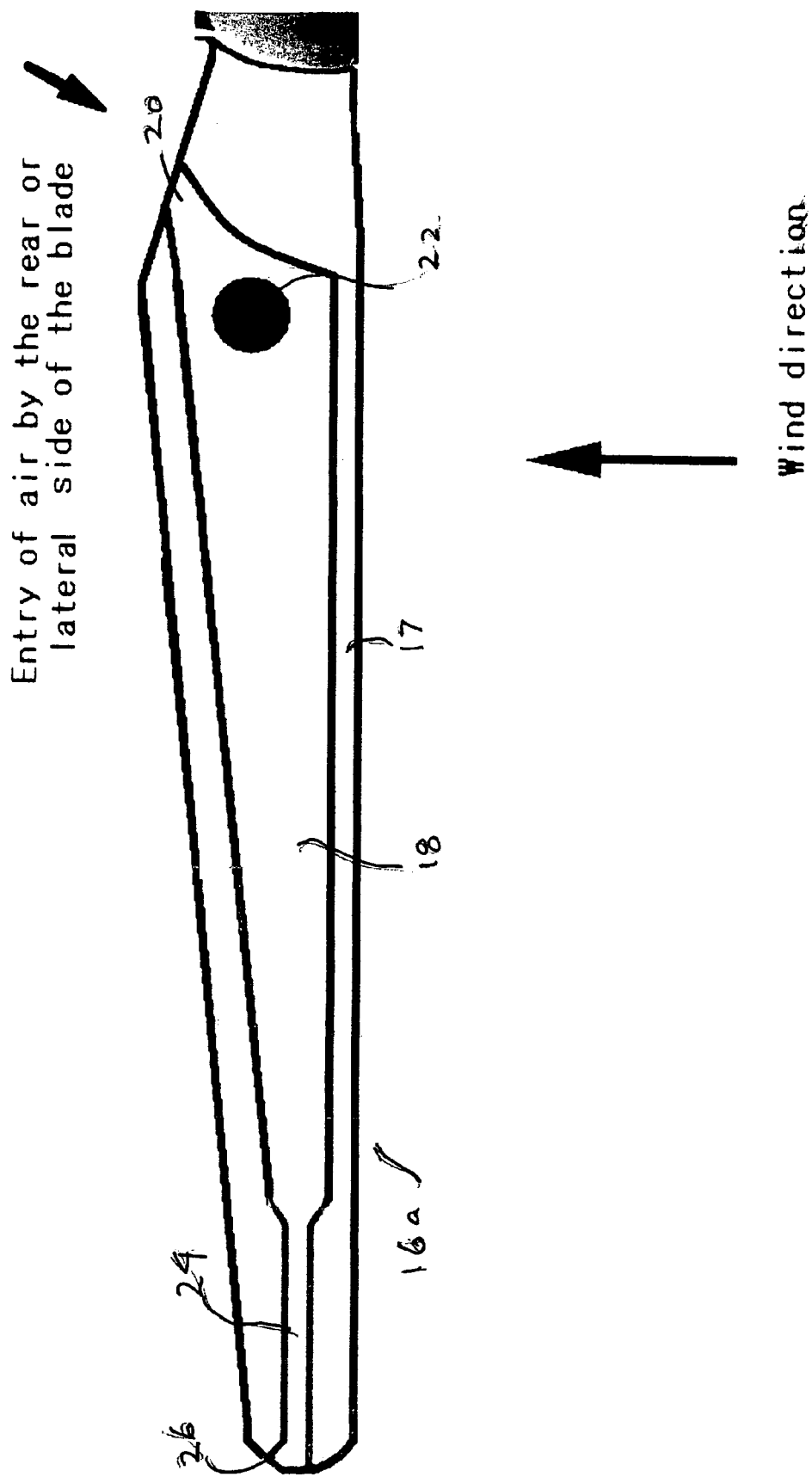
FIG. 2 is a cross-section of a wind turbine blade in accordance with an embodiment of the invention.

As shown in FIG. 2, the blade 16a includes an outer wall 17 which defines within it an inner hollow air pressure chamber 18 that communicates with an air inlet 20 at the rear or lateral side of the blade. A high-capacity fan or vacuum 22 (see also FIG. 6) is mounted to the blade wall at the location of air inlet 20 and functions to increase the velocity of the air within the pressure chamber 18 toward the direction of a one-way exit valve 24 located at an exit port 26 formed at the tip of the blade. Valve 24 communicates at its inlet with air chamber 18 and at its outlet with exit port 26. Operating voltage for the fan 22 is provided to the fan by a conductor (not shown) that extends to a suitable voltage source housed in the nacelle. In operation, high-velocity air created by the operation of the fan in the air chamber 18 is passed through valve 24 and escapes at a high velocity through exit port 26, thereby to create an increased impetus or torque on the blade causing an increase in the rotational velocity of the blade. The exit diameter of the valve 24 is advantageously adjustable to allow for a modification of the exit speed of the air from the interior of the blade to allow for a control of blade speed.

Figure 3:
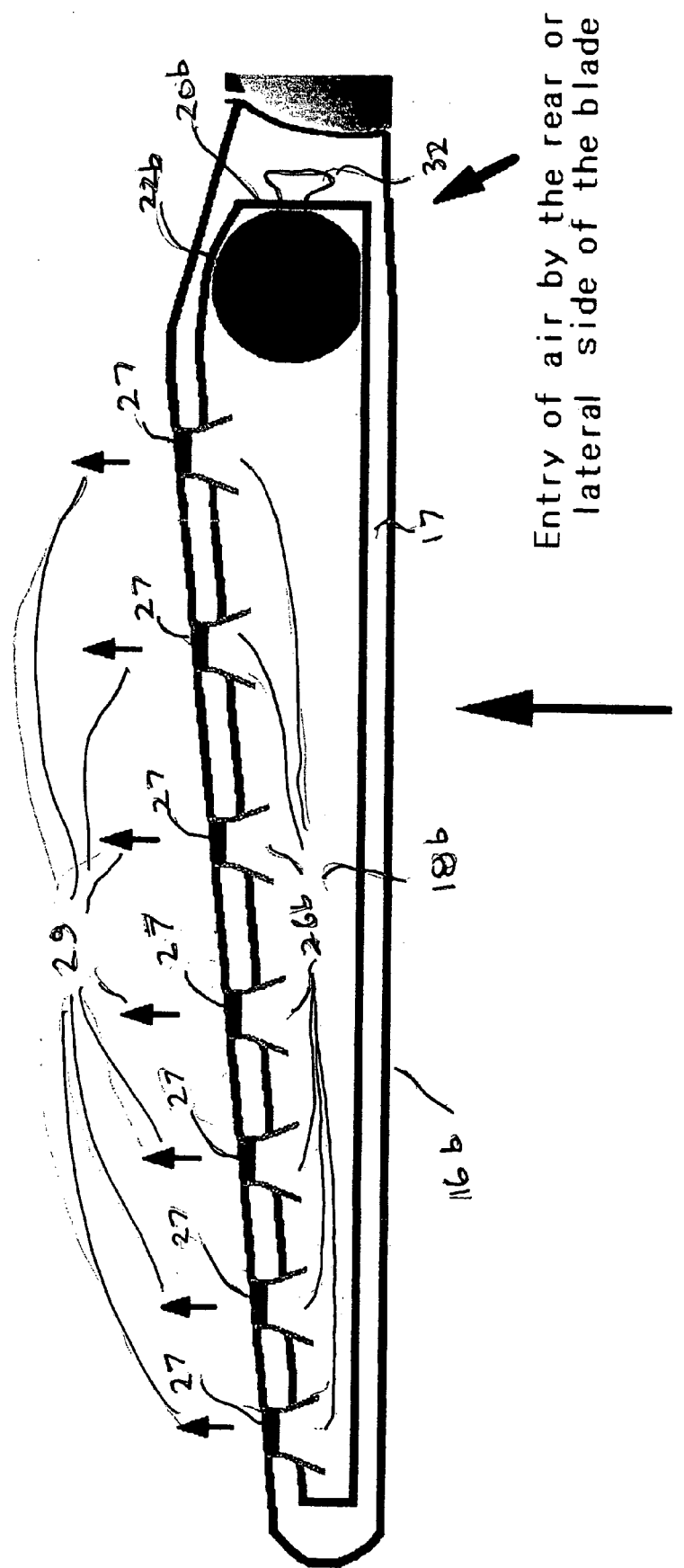
FIG. 3 is a cross-section of a wind turbine blade in accordance with a second embodiment of the invention.

In the turbine blade 16b shown in FIG. 3, a fan or vacuum 22b is mounted to the blade wall near an air inlet 20b located near one end of an internal air chamber 18b. A series of spaced pressure valves 26b are arranged along the leeward edge of the blade 16b. Valves 26b communicate at their inputs with air chamber 18b and at their outlets with a plurality of exit ports 27. The pressure valves 26b are normally closed and open only when the pressure of the compressed air within chamber 18b exceeds a preset value. When that occurs, air under increased pressure and velocity, in the form of air jets, escapes through now open valves 26b in the direction of the arrows 29 in FIG. 3. The exit diameter of valves 26b are preferable adjustable to allow for control of the exit speed of the air from the blade interior.

The air within chamber 18b may be advantageously compressed in two ways. In one arrangement, an extractor or aspirator 32 (FIG. 3) is housed within the air inlet 20b of each blade. This device includes a one-way valve which allows air to enter the air inlet but not to exit from it, thereby to cause the air entering the air chamber 18b to be compressed to a higher pressure within the chamber until the air pressure within the pressure chamber exceeds the control pressure of the pressure valves 26, at which time the valves 26b will open allowing the compressed air to exit the air chamber 18b through the now open valves 26b and exit ports 27b. As in the previously described embodiment of FIG. 2, the exit diameters of valves 26b are variable or adjustable to establish an exit air velocity that is dependent on the location of the wind turbine, the current wind conditions, or both. In an alternative arrangement an air compressor 28 (FIG. 5) is housed in the nacelle 12 and is connected by air tubes 30 (FIG. 5) to the interior air chambers 18b of each of the blades 16b.

Figure 4:
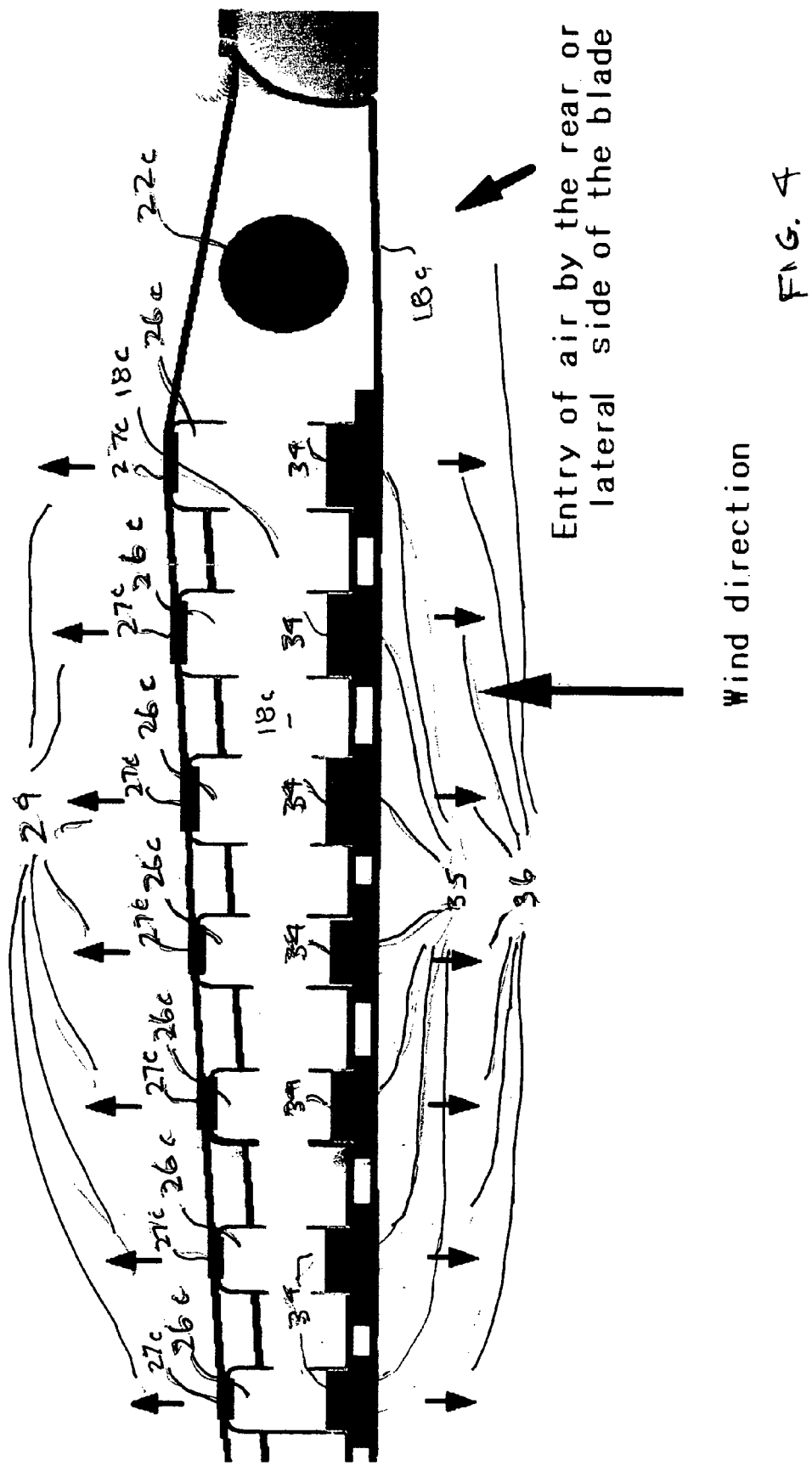
FIG. 4 is a cross-section of a wind turbine blade in accordance with a third embodiment of the invention.

The turbine blade 16c illustrated in FIG. 4 adds to the blade 16b of FIG. 3 a plurality of electrically controlled valves 34 located at a corresponding plurality of exit ports 35 formed along the windward edge of the blade. A wind velocity sensor 36 housed in the nacelle 12 senses the ambient wind velocity, and when the sensed wind velocity exceeds a predetermined safe maximum value, the sensor sends an electrical control signal to open all or a selected number of the normally closed windward valves 34 to allow air to escape from chamber 18c through valves 34 and exit ports 35 in the direction of arrows 36. This air flow escaping from the blade interior is opposite to the direction of the air flow through the pressure valves 26c and windward exit ports 27c in the opposite direction shown by arrows 29, thereby to reduce the rotational velocity of the blades 18c to a safe level while still allowing operation of the blades to generate electricity through the duration of the dangerously high wind conditions.

It will be appreciated from the foregoing description of a presently preferred embodiments that the wind turbine blade of the invention offers numerous advantages in terms of efficiency of electrical generation, upwards of as much as a 40 percent greater output of electricity for a given wind condition as compared to current wind turbine generators. It will also be appreciated by those of ordinary skill in the art that modifications may be made to the embodiments of the invention specifically described above, such as the inclusion of means for heating the air within the blade air chamber, without necessarily departing from the spirit and scope of the invention.

What is claimed is:

1. A wind turbine blade comprising an outer wall defining a hollow interior air chamber, an air inlet in communication with said air chamber, means located within said air chamber for increasing the velocity of the air within said air chamber, at least one exit opening in said blade wall, means located near said air inlet for increasing the pressure of the air within said air chamber, and pressure-responsive valve means arranged adjacent said exit opening for allowing air in said air chamber to escape from said at least one exit opening when the pressure of the air within said air chamber reaches a predetermined value.

2. The wind turbine blade of claim 1, in which said velocity-increasing means comprises a fan arranged adjacent said air inlet and further comprising a one-way valve at said exit opening permitting air to enter but not leave said air chamber.

3. The wind turbine blade of claim 1, in which said pressure-increasing means comprises a compressor and air conduit means extending from the outlet of said compressor to said air chamber.

4. The wind turbine blade of claim 1, comprising a plurality of said exit openings spaced from one another along one edge of said blade wall, and a plurality of said pressure-responsive valve means arranged respectively adjacent said plurality of exit openings.

5. The wind turbine blade of claim 4, in which the sizes of the outlets of said valve means are adjustable to vary the outlet velocity of air escaping through said exit openings.

6. The wind turbine blade of claim 1, further comprising a second plurality of exit openings arranged and spaced along an opposite edge of said blade wall, a second plurality of normally closed valve means arranged respectively at said second plurality of exit openings, and means for opening said second plurality of valve means when the ambient wind velocity exceeds a predetermined value, thereby to allow air from said air chamber to escape from said second plurality of exit openings and to reduce the rotational velocity of the blade.

7. A wind turbine blade comprising an outer wall defining a hollow interior air chamber, a first plurality of exit openings arranged and spaced along one edge of said blade wall, a second plurality of exit openings arranged and spaced along a second opposing edge of said blade wall, first valve means intermediate said first plurality of exit openings and said air chamber for allowing, when open, air from said air chamber to exit from said first plurality of exit openings to produce a driving impetus to the blade, normally closed second valve means intermediate said air chamber and said second plurality of exit openings, and ambient wind-velocity sensing means coupled to said second valve means and effective upon the detection of an ambient wind velocity exceeding a predetermined level to open said second valve means, thereby to allow air from said air chamber to escape through said second plurality of exit openings, thereby to reduce the blade rotational velocity.

8. The wind turbine of claim 7, further comprising means for increasing the pressure of the air within said air chamber, said first valve means being caused to open when the pressure of the air within said air chamber exceeds a predetermined value to cause air from said air chamber to escape through said first plurality of exit openings at an increased velocity.

9. The wind turbine blade of claim 8, in which the sizes of the outlets of said first and second valve means are adjustable to allow for the respective varying of the escape velocity of air through said first and second exit openings.

10. A wind turbine including three equiangularly spaced turbine blades as claimed in claim 1.

11. A wind turbine including three equiangularly space turbine blades as claimed in claim 7.

\* \* \* \* \*